United States Patent
Wong et al.

(10) Patent No.: US 7,375,472 B2
(45) Date of Patent: May 20, 2008

(54) HIGHLY EFFICIENT DRIVING OF PHOTOFLASH DIODES USING LOW AND FIXED VOLTAGE DROP-OUT CURRENT SINK

(75) Inventors: Footshen Wong, Singapore (SG); Vlad Popescu-Stanesti, San Jose, CA (US); Mingkwong Han, Singapore (SG); Xiachua Hou, Shanghai (CN); ChunHsi Lin, Yi-Lan Shien (TW)

(73) Assignee: O2Micro International Limited, Grand Cayman (KY)

( * ) Notice: Subject to any disclaimer, the term of this patent is extended or adjusted under 35 U.S.C. 154(b) by 360 days.

(21) Appl. No.: 11/148,529

(22) Filed: Jun. 8, 2005

(65) Prior Publication Data

US 2006/0114954 A1   Jun. 1, 2006

Related U.S. Application Data

(60) Provisional application No. 60/631,899, filed on Nov. 29, 2004.

(51) Int. Cl.
*H05B 37/02* (2006.01)
(52) U.S. Cl. ............... 315/307; 315/224; 315/291

(58) Field of Classification Search ........... 315/161, 315/209 R, 224–226, 291, 307–308; 345/82, 345/84; 323/222–226
See application file for complete search history.

(56) References Cited

U.S. PATENT DOCUMENTS

| | | | |
|---|---|---|---|
| 2003/0117087 A1* | 6/2003 | Barth et al. | 315/291 |
| 2004/0164685 A1* | 8/2004 | Dygert | 315/224 |
| 2004/0251854 A1* | 12/2004 | Matsuda et al. | 315/291 |
| 2005/0093488 A1* | 5/2005 | Hung et al. | 315/307 |
| 2005/0231133 A1* | 10/2005 | Lys | 315/291 |
| 2005/0243041 A1* | 11/2005 | Vinn | 345/82 |
| 2006/0132061 A1* | 6/2006 | McCormick et al. | 315/291 |

* cited by examiner

*Primary Examiner*—Thuy V. Tran
*Assistant Examiner*—Tung X Le (57) ABSTRACT

A circuit according to the present invention is used for driving a photoflash diode and comprises a current sink, a feedback circuit, and a DC-DC converter. The current sink is coupled to the photoflash diode for controlling the current through the photoflash diode. The feedback circuit receives a feedback signal indicative of the electrical condition of said first current regulator. The DC-DC converter is coupled to an external power source and the feedback circuit for powering the photoflash diode so as to control the electrical condition of the current sink to a predetermined value.

21 Claims, 6 Drawing Sheets

HIGHLY EFFICIENT DRIVING OF PHOTOFLASH DIODES USING LOW AND FIXED VOLTAGE DROP-OUT CURRENT SINK

CROSS REFERENCE TO PROVISIONAL APPLICATION

This application claims priority to the co-pending provisional patent application Ser. No. 60/631,899, entitled "Highly Efficient Driving of Photoflash Diodes Using Low And Fixed Voltage Drop-out Current Sink," with filing date Nov. 29, 2004, and assigned to the assignee of the present invention, which is herein incorporated by reference in its entirety.

BACKGROUND OF THE INVENTION

1. Field of the Invention

The present invention relates to the field of drivers for photoflash diodes, and more particularly to the field of drivers for photoflash diodes using current sink with low and fixed drop-out voltage. Specifically, the present invention relates to the circuits and control methods that are used for driving photoflash diodes in portable battery devices.

2. Description of the Related Art

Portable battery devices drive photoflash diodes using a controller to coordinate the use of the battery power. Existing solutions drive the photodiodes from a fixed voltage and then control the diode current through a controlled current sink or current source. However, at low diode current most of the power is wasted through the current sink.

Accordingly, there exists a need for a charging system or circuit which is able to overcome the above mentioned drawbacks.

SUMMARY OF THE INVENTION

It is an object of the present invention to provide a circuit and control method for driving photoflash diodes used in portable battery devices. Specifically, photoflash diodes are driven using one or more current sinks with a low and fixed drop-out voltage. The diodes are driven from a boost or buckboost controller. This forces the current sink drop-out voltage to a very low value through a closed loop feed back system.

In order to achieve the above object, the present invention provides a circuit for driving a photoflash diode. The circuit according to the present invention comprises a photoflash diode, a current sink, a feedback circuit, and a DC-DC converter. The current sink is coupled to the photoflash diode for controlling the current through the photoflash diode. The feedback circuit receives a feedback signal indicative of the electrical condition of said first current regulator. The DC-DC converter is coupled to an external power source and the feedback circuit for powering the photoflash diode so as to control the electrical condition of the current sink to a predetermined value.

BRIEF DESCRIPTION OF THE DRAWINGS

Other objects, advantages, and novel features of the invention will become more apparent from the following detailed description when taken in conjunction with the accompanying drawing.

DESCRIPTION OF THE EMBODIMENT

Reference will now be made in detail to the preferred embodiments of the present invention, circuits and methods of driving photoflash diodes. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
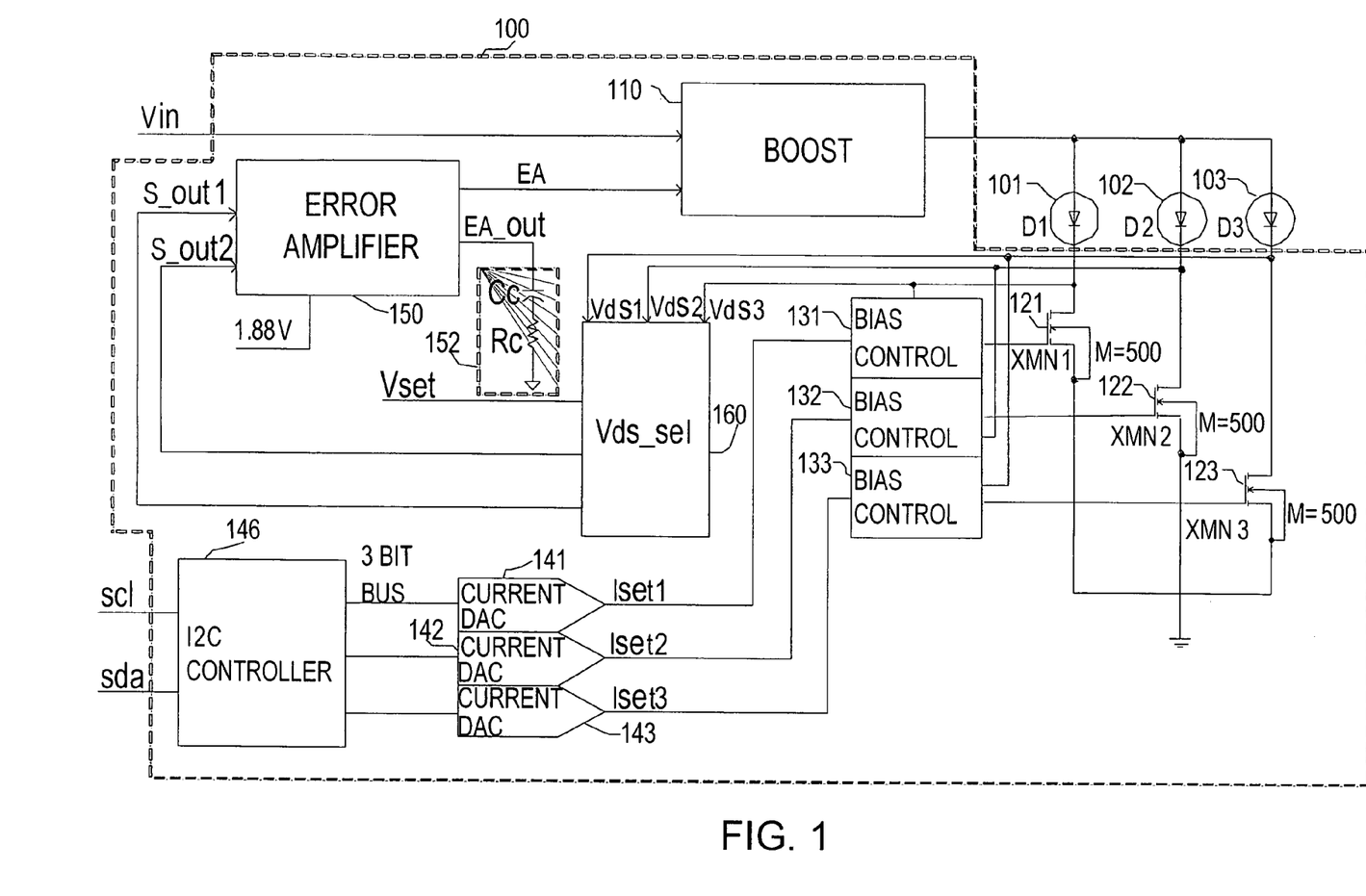
FIG. 1 is a block diagram of a photoflash driving circuit according to an embodiment of the present invention.

Referring to FIG. 1, a photoflash driving circuit 100 according to an embodiment of the present invention is illustrated. The photoflash driving circuit 100 is used to drive three photoflash diodes 101, 102, and 103. It will be apparent to those skilled in the art that the three photoflash diodes 101, 102, and 103 may be a red, green, and blue photoflash diodes, respectively, for being served as a white light source. Further, the photoflash driving circuit 100 may be used to drive one or more photoflash diodes. It should be understood that the driving circuit 100 can also be used to drive one or more diodes.

An input voltage source is coupled to a DC-DC converter, such as a boost or buckboost 110, which is coupled to the photoflash diodes 101, 102, and 103 so as to provide a voltage to drive the photoflash diodes 101, 102, and 103.

Three N-type MOSFETs (metal-oxide semiconductor field-effect transistor) are served as current regulators, i.e., current sinks 121, 122, 123. The drains of the N-type MOSFETs 121, 122, and 123 are coupled to the photoflash diodes 101, 102, and 103, respectively, and the sources of the N-type MOSFETs 121, 122, and 123 are coupled to ground. The gates of the N-type MOSFETs 121, 122, and 123 are coupled to three bias controllers 131, 132, and 133, respectively. The voltage signal, Vds1, Vds2, and Vds3 of the drains of the MOSFETs 121, 122, and 123 are input into the bias controllers 131, 132, and 133. An I2C controller 146 is coupled to three current DACs (Digital-to-Analog Converter) 141, 142, and 143, which are coupled to the bias controllers 131, 132, and 133, respectively.

It will be apparent to those skilled in the art that the photoflash driving circuit 100 can be modified to use three P-type MOSFETs served as current sources in place of the current sinks 121, 122, 123.

Two current control signals, clock (Scl) and data (Sdata), are input into the I2C controller 146 such that the I2C controller provides current setting information, for example, of 3 bits to the current DACs 141, 142, and 143. Based on the current setting information, the current DACs 141, 142, and 143 will generate three current signals, Iset1, Iset2, and Iset3, which are transmitted to the bias controllers 131, 132, and 133, respectively.

The bias controllers 131, 132, and 133 control the drain currents of the current sinks 121, 122, and 123, i.e., the sink currents. Feedback signals, such as the voltages of the drains of the current sinks 121, 122, and 123, are input into the bias controllers 131, 132, and 133. The bias controllers 131, 132, and 133 provide voltages applied to the gate of the MOSFETs 121, 122, and 123 in accordance with the current signals of the current DACs 141, 143, and 143 and the voltages of the drains of the current sinks 121, 122, and 123 so as to sink the precise amount of current and thus control the brightness of the photoflash diodes 101, 102, and 103.

The voltages of the drains of the MOSFETs 121, 122, and 123 are input into a voltage selecting logic circuit 160. A voltage set signal (Vset) is the voltage set for the drop-out voltage, and is also input into the voltage selecting logic circuit 160. The voltage selecting logic circuit 160 is used to select a lowest voltage from the voltages of the drains of the MOSFETs 121, 122, and 123. This lowest voltage and the voltage set signal will be processed at the same procedure in the voltage selecting logic circuit 160 such that the voltage selecting logic circuit 160 generates a lowest voltage signal, S_out1, corresponding to the lowest voltage and a set voltage signal, S_out2, corresponding to the set voltage.

Both the lowest voltage signal and the set voltage signal are input into an error amplifier block 150. The error amplifier block 150 amplifies the error voltage between the lowest voltage signal and the set voltage signal. The error amplifier block 150 has a pin (EA-out) coupled to an external capacitor and resistor network 152 for compensating the output (EA) of the error amplifier block 150, i.e., for compensating the amplified voltage. The capacitor and resistor network also doubles up as a self-start due to the slewing of rate of voltage charging and discharging. The error amplifier block 150 is further provided with a limitation input. For example, in accordance with one embodiment, the limitation input can be a limitation voltage, such as 1.88 volts as shown, to limit the output voltage level of the error amplifier block 150 to the limitation voltage, 1.88 volts. The output of the error amplifier block 150 is input into the boost/buckboost 110 for being served as a voltage feedback signal for controlling the output voltage of the boost/buckboost 110.

The output voltage of the boost/buckboost 110 is used to drive the photoflash diodes 101, 102, and 103. The output voltage of the photoflash diodes 101, 102, and 103 or the drop-out voltages of the current sinks 121, 122, and 123, i.e, the drain voltages of the MOSFET 121, 122, and 123, will be sampled into the voltage selecting logic circuit 160 and then to the error amplifier block 150 for generating the voltage feedback signal. The drain voltages of the MOSFET 121, 122, and 123 will be forced to the voltage set by the voltage set signal, Vset, for example, 0.1 volts.

Figure 2:
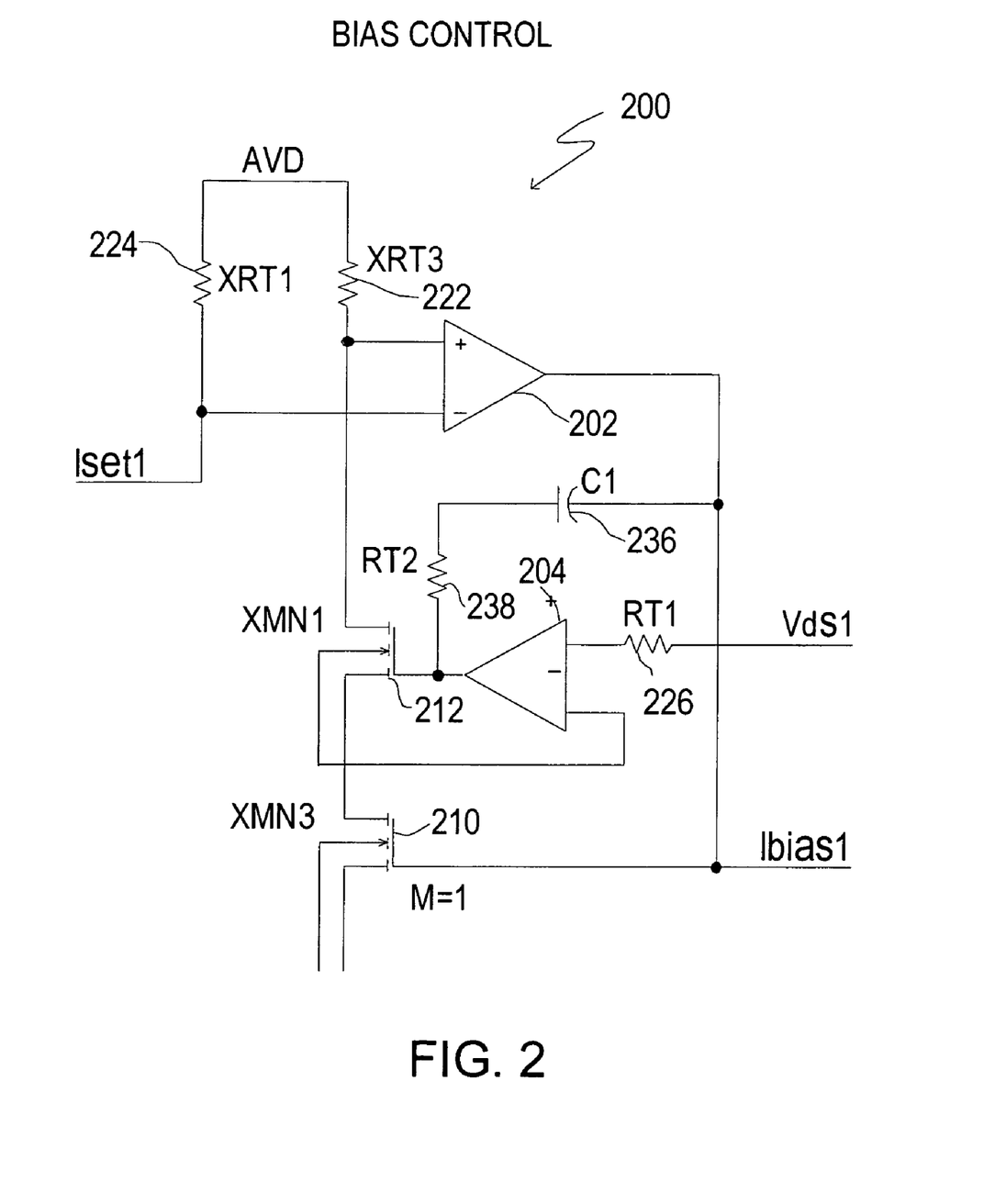
FIG. 2 is a block diagram of a bias controller according to an embodiment of the present invention.

Referring to FIG. 2, an exemplary bias controller 200 according to an embodiment of the present invention is illustrated and may be used in the photoflash driving circuit 100 as the bias controller 131, 132, or 133. The current signal, Iset, from the current DAC is input into the bias controller 200 for setting the current value.

For example, the bias controller 200 is used in the photoflash driving circuit 100 as the bias controller 131. In this case, the voltage of the drain of the MOSFET 121, Vds1 is sampled into the op amp 204 through a resistor 226. The output of the op amp 204 is coupled to the gate of a MOSFET 212 and the drain of the MOSFET 210 is coupled to the input of the op amp 204 such that the voltage of the drain of the MOSFET 210 is forced to the drain voltage of the MOSFET 121. As mentioned above, the drain voltage of the MOSFET 121 approaches the set voltage, such as 0.1 volts, which is considerably low, so that the MOSFET 121 and the MOSFET 210 will be operate in the triode or linear region.

Furthermore, an input of an op amp (operational amplifier) 202 of the bias controller 200 is coupled to the current signal, Iset, and another input of the op amp 202 is coupled to the Iset signal through two resistors 222 and 224. A resistor 238 and a capacitor 236 are coupled between the output of the op amp 202 and the output of the op amp 204 for compensating both the op amp 202 and the op amp 204. The output of the op amp 202 is coupled to the gate of the N-type MOSFET 210. The drain current of the MOSFET 210 is forced by the op amp 202 to the set current.

It should be noted that the gate of the MOSFET 210 is coupled to one of the gate of the current sinks 121 so as to form a current mirror, in accordance with one embodiment of the present invention. The drain current of the current sink 121 is proportional to the drain-source circuit of a MOSFET 210. For example, if the MOSFET 121 is 500 times as large as the MOSFET 210, the drain current of the MOSFET 121 will be 500 times as large as that of the MOSFET 210, i.e., the set current.

Figure 3:
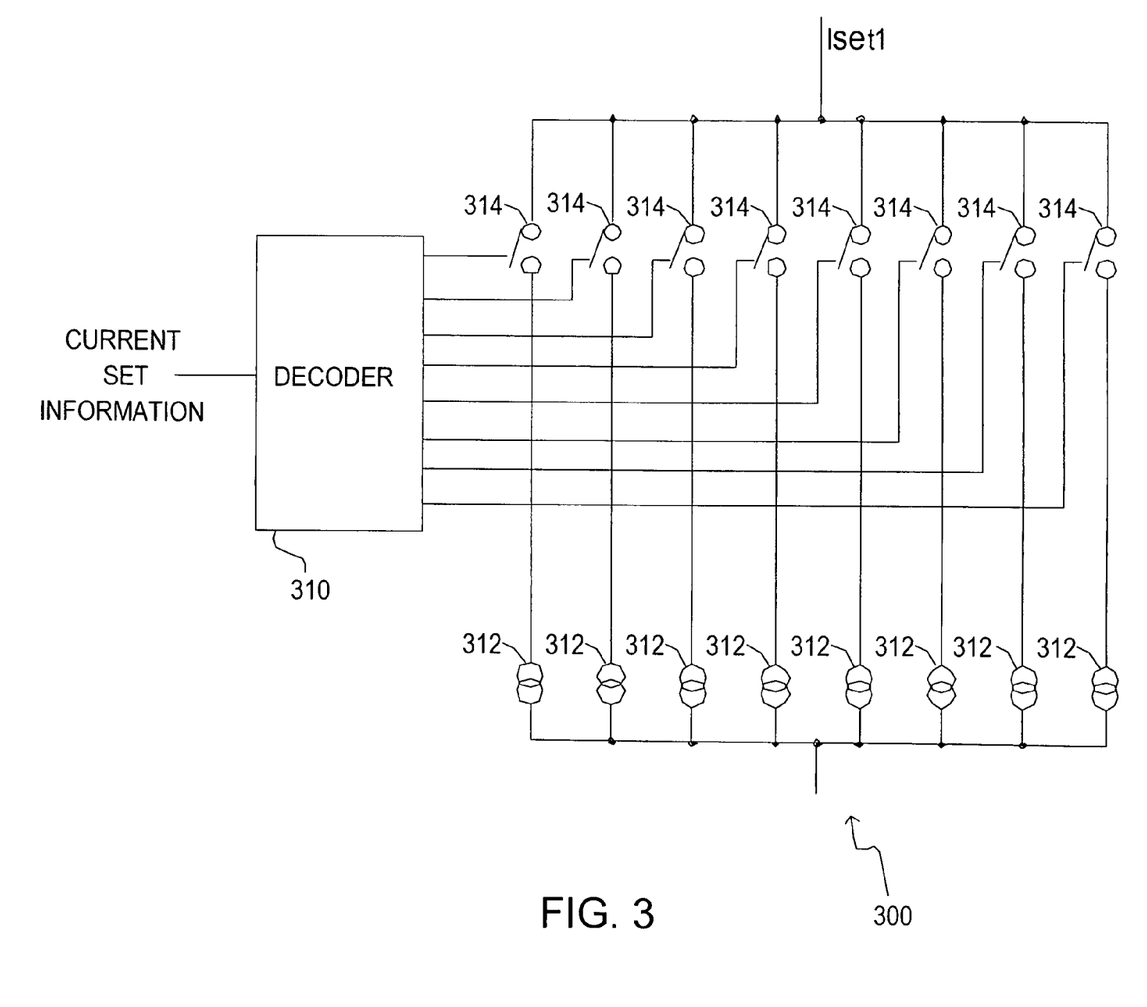
FIG. 3 is a block diagram of a current DAC according to an embodiment of the present invention.

Referring to FIG. 3, an exemplary current DAC 300 according to an embodiment of the present invention is illustrated and may be used in the photoflash driving circuit 100 as the current DACs 141, 142, or 143. The current setting information is input into a decoder 310 of the current DAC 300. For example, the current setting information is formed of 3-bit digital information. The current DAC 300 further has eight switches 314 and eight current sources 312 respectively coupled to the eight switches 314, respectively. The current setting information is decoded by the decoder 310 so as to individually turn on or off eight switches 314 and generate the current signal, Iset1. In accordance with one embodiment, the current signal is the sum of the current of the current source or sources 312 of which the switch 312 is turned on.

Figure 4:
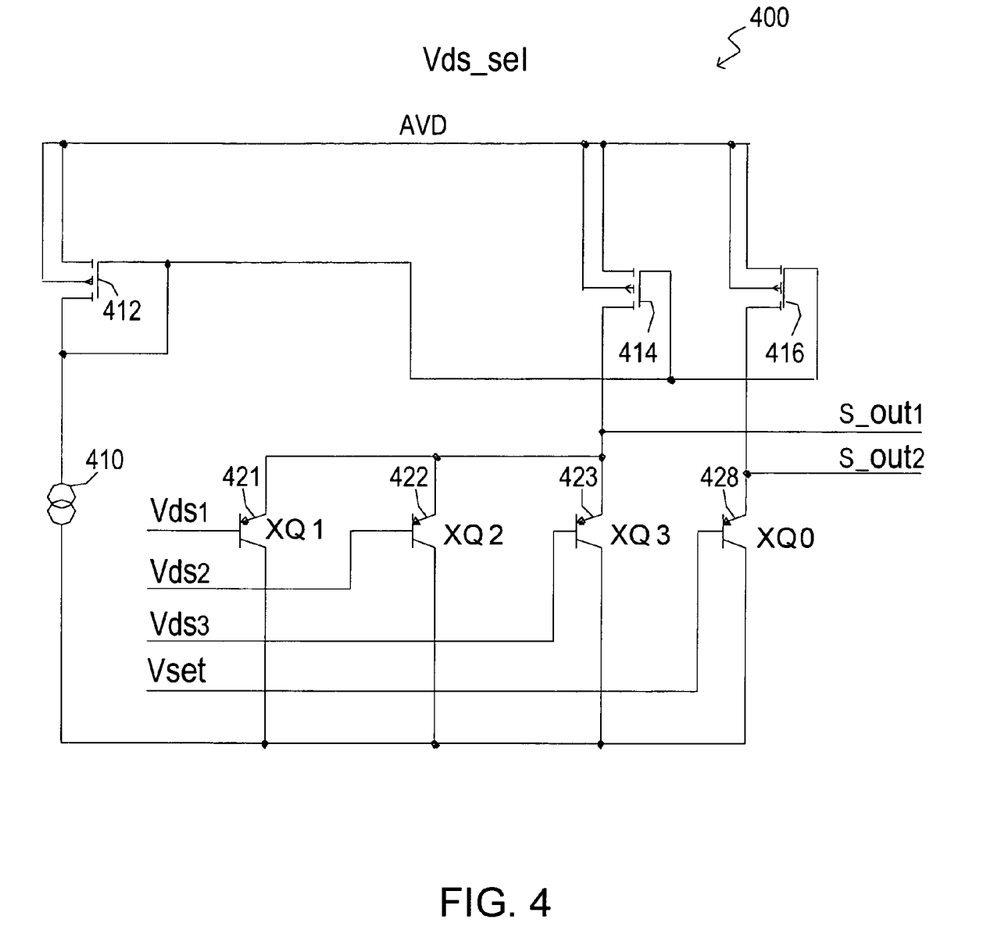
FIG. 4 is a block diagram of a voltage selecting logic circuit according to an embodiment of the present invention.

Referring to FIG. 4, an exemplary voltage selecting logic circuit 400 according to an embodiment of the present invention is illustrated and may be used in the photoflash driving circuit 100 as the voltage selecting logic circuit 160. The voltage selecting logic circuit 400 comprises a current source 410, three P-type MOSFET 412, 414, and 416, three transistors 421, 422, and 423, and a set voltage transistor 428. The base of the set voltage transistor 428 is coupled the voltage set signal, Vset, and the bases of the three transistors 421, 422, and 423 are coupled to the drains of the MOSFETs 121, 122, and 123, respectively. The lowest voltage signal, S_out1, which is corresponding to the lowest voltage is equal to the base-emitter voltage of the transistor 421, 422 or 423 plus the lowest voltage in the voltages of the drains of the MOSFETs 121, 122, and 123. The set voltage, S_out2, is equal to the base-emitter voltage of the transistor 428 plus the voltage of voltage set signal. It should be understood that the MOSFET 414 and 416 is used for current match, and the size of the transistor 428 is three times as large as that of one of the transistor 421, 422, and 423.

Figure 5:
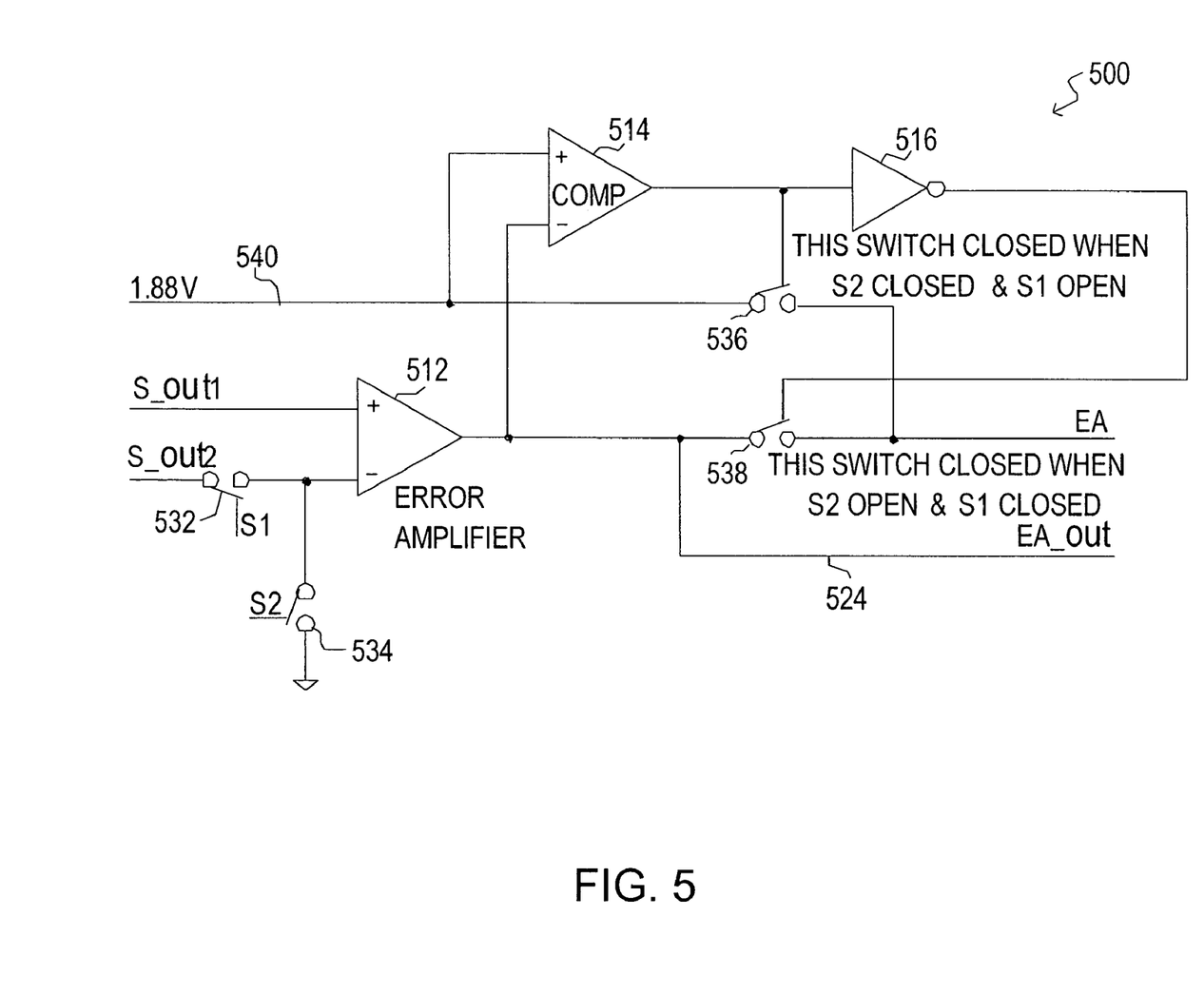
FIG. 5 is a block diagram of a error amplifier block according to an embodiment of the present invention.

Referring to FIG. 5, an exemplary error amplifier block 500 according to an embodiment of the present invention is illustrated and may be used in the photoflash driving circuit 100 as the error amplifier block 150. The error amplifier block 500 comprises an error amplifier 512 of which two inputs are coupled to the lowest voltage signal and the set voltage signal, respectively, for outputting an amplified voltage according to the difference thereof. A pin 524 is coupled to a compensating circuit, such as the external capacitor and resistor network 152, and also coupled to the output of the error amplifier 512 for compensating the output of the error amplifier block 150, EA.

A limitation input 540 of the error amplifier block 500 is coupled to a comparator 514 and a switch 536. The error amplifier block 500 further comprises a switch 538 for coupling the output of the error amplifier 512 to the output of the error amplifier block 150, EA, a switch 532 for coupling the set voltage signal to the input of the error amplifier 512, and a switch 534 for coupling the input of the error amplifier 512 to ground. The switch 532 is actuated by the switch 538, and the switch 534 is actuated by the switch 536. If the output of the error amplifier 512 is smaller than the voltage of the limitation input 540, for example, 1.88 volts, the output of the comparator 514 will be kept in low. In this case, the switch 536 is open or turned-off and the switch 538 is close or turned-on. In addition, the switch 534 is open and the switch 532 is closed. The error amplifier block 500 will be functioning according to the function mentioned above. If the output of the error amplifier 512 is larger than the voltage of the limitation input 540, for example, 1.88 volts, the output of the comparator 514 will be kept in high. In this case, the switch 536 and the switch 534 are closed or turned-on and the switch 538 and the switch 532 are open or turned-off. The output of the output of the error amplifier block 150, EA, is the voltage of the limitation input 540, for example, 1.88 volts.

Figure 6:
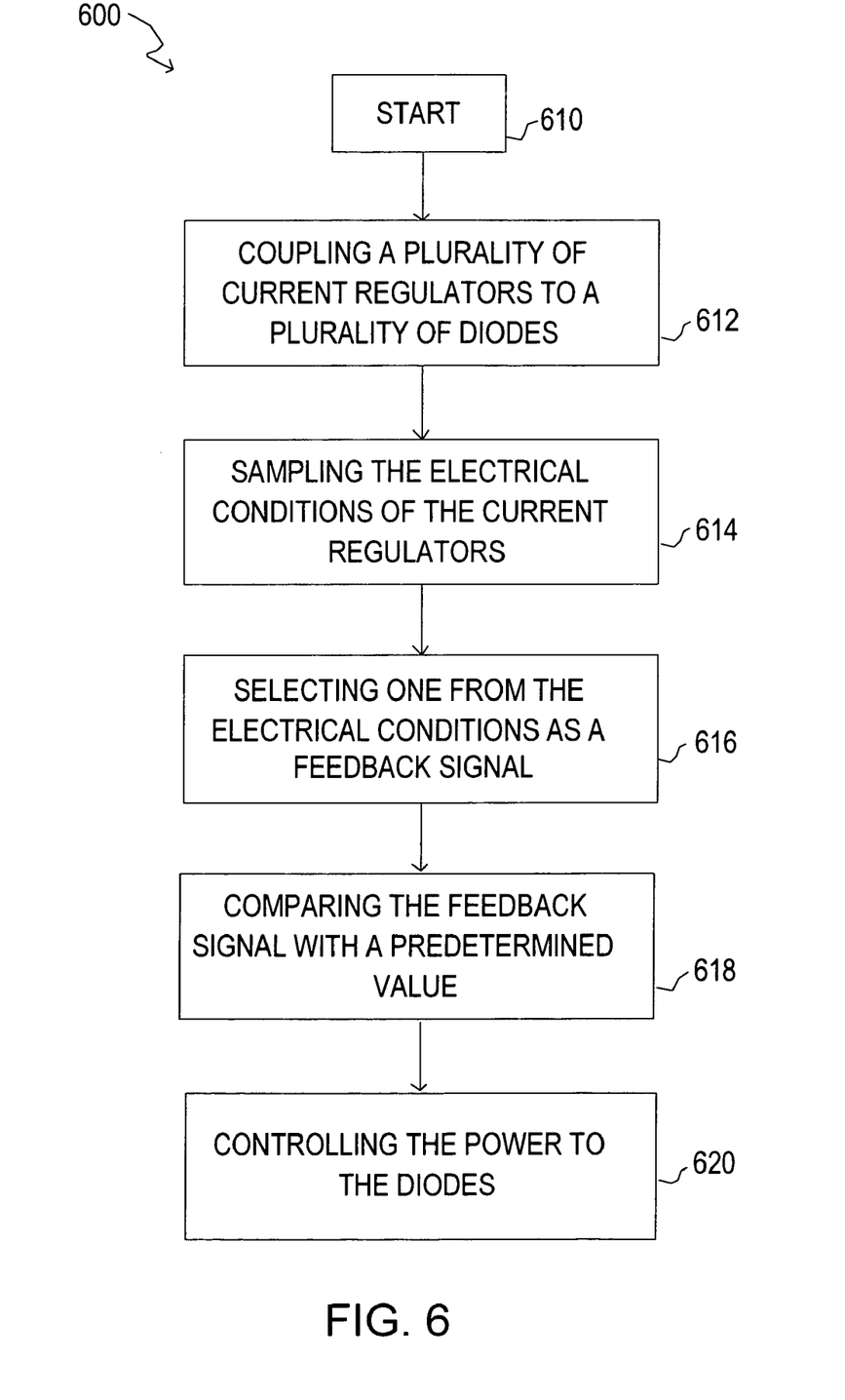
FIG. 6 is the diagram showing a method for driving a plurality of photoflash diodes according to an embodiment of the present invention.

Referring to FIG. 6, a method 600 for driving a plurality of photoflash diodes according to an embodiment of the present invention is illustrated. At 610, the photoflash diodes are being prepared to be driven. At 612, a plurality of current regulators, such as a MOSFET or a transistor which is served as a current sinks, are coupled to the photoflash diodes. Hereinafter, the current sink will be taken as an exemplary current regulator for describing the embodiment of the present invention. It should be understood by those skilled in the art that the current sink can be replaced with a current source formed of a MOSFET or a transistor. An external power source will supply power to the photoflash diodes under the regulation of the current sinks.

At 614, the electrical conditions of the current sinks are sampled. In an embodiment of the present invention, the electrical condition is voltage. At 616, one of the electrical conditions is selected to represent the whole electrical condition of the current sinks and to being served as a feedback signal. At 618, the feedback signal is compared with a predetermined value to obtain the difference between the feedback signal and the predetermined value. At 620, power supplied to the photoflash diode will be controlled such that the electrical condition of the current sink is forced to the predetermined value.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A driving circuit comprising:
    a first diode;
    a first current regulator coupled to said first diode operable for controlling a current through said first diode and for providing a voltage signal;
    a feedback circuit operable for receiving a first feedback signal indicative of an electrical condition of said first current regulator;
    a DC-DC converter coupled to an external power source and said feedback circuit for powering said first diode so as to control said electrical condition of said first current regulator to a predetermined; and
    a bias controller operable for receiving a specified current signal and said voltage signal and for driving said first current regulator according to said specified current signal and said voltage signal.

2. The driving circuit of claim 1, wherein said first diode comprises a photoflash diode.

3. The driving circuit of claim 1, further comprising:
    an error amplifier for comparing said first feedback signal and a predetermined signal indicative of said predetermined value so as to determine power supplied to said first diode.

4. The driving circuit of claim 3, wherein said error amplifier comprises:
    a comparator for comparing said first feedback signal and said predetermined signal and for outputting an amplified error signal to determine said power supplied to said first diode;
    a switch network for disenabling said comparator and for outputting a fixed signal when said amplified error signal is larger than said fixed signal.

5. The driving circuit of claim 1, further comprising:
    a second diode;
    a second current regulator coupled to said second diode for controlling a current through said second diode; and
    a selecting circuit coupled to said first current regulator and said second current regulator and for generating a second feedback signal selectively indicative of said electrical condition of said first current regulator and an electrical condition of said second current regulator.

6. The driving circuit of claim 5, wherein said second feedback signal is indicative of a lower voltage from voltages at said first current regulator and said second current regulator.

7. The driving circuit of claim 1, wherein said current regulator is comprises a current sink.

8. The driving circuit of claim 1, wherein said bias controller further comprises:
    a first MOSFET, wherein a gate of said first MOSFET is coupled to a gate of said current regulator and is driven in a linear region; and
    a second MOSFET, wherein a gate of said second MOSFET is coupled to said first feedback signal.

9. A method for driving a diode comprising:
    controlling a current through said diode by a current regulator;
    providing a voltage signal from said current regulator to a bias controller;

providing a specified current signal to said bias controller;
driving said current regulator by said bias controller according to said voltage signal from said current regulator and according to said specified current signal;
generating a feedback signal indicative of an electrical condition of said current regulator; and
supplying power to said diode according to said feedback signal so as to force said electrical condition of said current regulator to a predetermined value.

10. The method of claim 9, wherein said diode comprises a photoflash diode.

11. The method of claim 9, further comprising:
comparing said feedback signal and a predetermined signal indicative of said predetermined value so as to determine said power supplied to said diode.

12. A method for driving a plurality of diodes comprising:
controlling a plurality of currents through said diodes by a plurality of current regulators, respectively;
providing a plurality of voltage signals from said plurality of current regulators to a bias controller;
providing a plurality of specified current signals to said bias controller;
driving said plurality of current regulators by said bias controller according to said plurality of voltage signals from said current regulators and according to said plurality of specified current signals;
generating a feedback signal indicative of a plurality of electrical conditions of said current regulators; and
supplying power to said plurality of diodes according to said feedback signal so as to force said plurality of electrical conditions of said current regulators to a predetermined value.

13. The method of claim 12, wherein said diode comprises a photoflash diode.

14. The method of claim 12, wherein generating a feedback signal further comprises:
selecting a lowest voltage signal from said plurality of voltage signals generated at said current regulators; and
generating said feedback signal indicative of said lowest voltage signal.

15. The method of claim 14, wherein said current regulator comprises a current sink.

16. The method of claim 12, further comprising:
comparing said feedback signal and a predetermined signal indicative of said predetermined value so as to determine said power supplied to said plurality of diodes.

17. A driving circuit for driving a plurality of diodes comprising:
a plurality of current regulators coupled to said plurality of diodes for controlling a plurality of currents through said plurality of diodes, respectively;
a selecting circuit coupled to said plurality of current regulators for selecting a lowest voltage from a plurality of drop-out voltages of said plurality of current regulators;
a feedback circuit for generating a feedback signal indicative of said lowest voltage; and
a DC-DC converter coupled to an external power source and said feedback circuit for supplying power to said plurality of diodes so as to allow said plurality of drop-out voltages of said current regulators to be forced to a predetermined voltage.

18. The driving circuit of claim 17, wherein said selecting circuit further comprises:
a plurality of transistors coupled in parallel, wherein a plurality of bases of said plurality of transistors are coupled to said plurality of current regulators, respectively, such that a voltage of a plurality of collectors in common is indicative of said lowest voltage.

19. The driving circuit of claim 17, further comprising:
an error amplifier coupled to said DC-DC converter and said feedback circuit for comparing said feedback signal and a predetermined signal indicative of said predetermined voltage so as to generate an output signal indicative of a difference between said lowest voltage and said predetermined voltage for determining said power.

20. The driving circuit of claim 17, further comprising:
a bias controller operable for receiving said plurality of drop-out voltages and a plurality of specified current signals and for driving said plurality of current regulators according to said plurality of drop-out voltages and said specified current signals.

21. The driving circuit of claim 17, wherein at least one of said plurality of drop-out voltages is different from the remaining drop-out voltages.

* * * * *